United States Patent
Marcerou (12)

(10) Patent No.: US 6,222,659 B1
(45) Date of Patent: Apr. 24, 2001

(54) REPEATER FOR SOLITON SIGNAL FIBER OPTIC TRANSMISSION SYSTEMS

(75) Inventor: Jean-Francçis Marcerou, Corbeil-Essonnes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/992,909

(22) Filed: Dec. 18, 1997

(30) Foreign Application Priority Data

Dec. 19, 1996 (FR) .................................................. 96 15639

(51) Int. Cl.[7] ............................ H04B 10/00; H04B 17/00
(52) U.S. Cl. ............................................. 359/177; 359/110
(58) Field of Search .................................. 359/174, 179, 359/141, 177, 173, 188, 195, 110

(56) References Cited

U.S. PATENT DOCUMENTS

| | | | |
|---|---|---|---|
| 4,881,788 | * 11/1989 | Doran | 350/96.15 |
| 5,710,660 | * 1/1998 | Yamamoto et al. | 359/341 |
| 5,748,363 | * 5/1998 | Duck et al. | 359/341 |
| 5,778,014 | * 7/1998 | Islam | 372/6 |
| 5,857,040 | * 1/1999 | Bigo et al. | 385/15 |
| 5,959,764 | * 9/1999 | Edgawa | 359/326 |

FOREIGN PATENT DOCUMENTS 2207827A  2/1989  (GB) .
2273838A  6/1994  (GB) .

OTHER PUBLICATIONS

M. Nakazawa et al, "40GBit/s WDM (10GBits/s×4 Unequally Spaced Channels) Colition Transmission Over 10000KM Using Synchronous Modulation and Narrow Band Optical Filtering", *Electronics Letters*, vol. 32, No. 9, Apr. 25, 1996, pp. 828–830.
Patent Abstracts of Japan, vol. 096, No. 004, Apr. 30, 1996 corresponding to JP 07 336298 A (Nippon Telgr & Teleph Corp.) dated Dec. 22, 1995.
Patent Abstracts of Japan, vol. 095, No. 010, Nov. 30, 1995 corresponding to JP 07 170232 A (Nippon Telegr & Teleph Corp.) dated Jul. 4, 1995.

* cited by examiner

*Primary Examiner*—Leslie Pascal
*Assistant Examiner*—Agustin Bello
(74) *Attorney, Agent, or Firm*—Sughrue, Mion, Zinn, Macpeak & Seas, PLLC

(57) ABSTRACT

A repeater for soliton signal optical fiber transmission systems has an optical part which includes at least one soliton signal monitoring device such as a filter or a synchronous modulator, and a branch connection for signals that would be cut off by the monitoring device. The branch connection can be used to match the gain of the repeater to low frequency signals. The repeater enables the use in a soliton signal fiber optic transmission system of low frequency signals such as NRZ signals, or modulation of a continuous wave such as for repeater monitoring or surveillance.

13 Claims, 2 Drawing Sheets

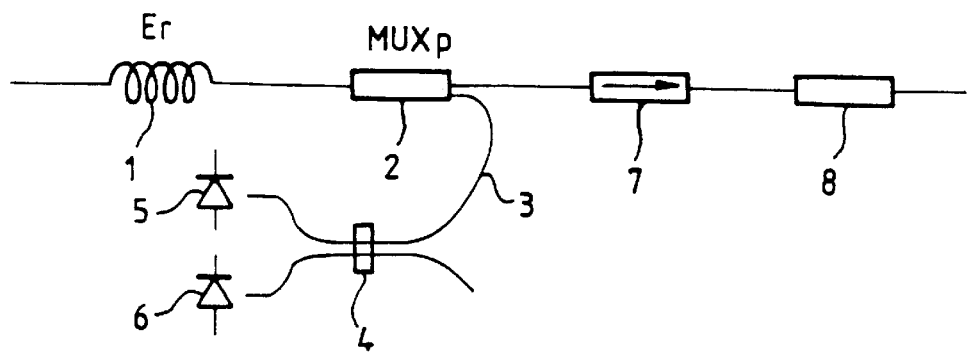
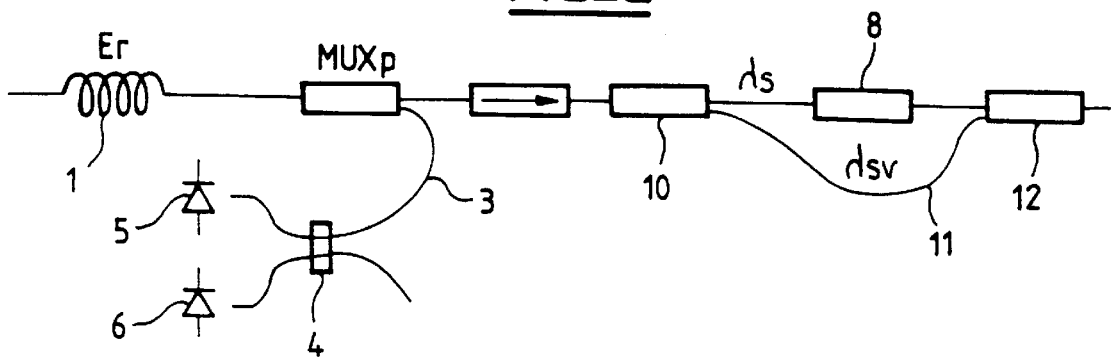
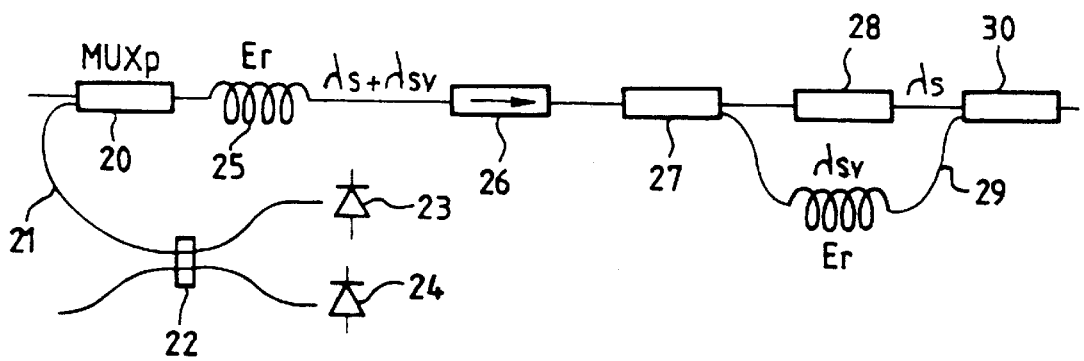

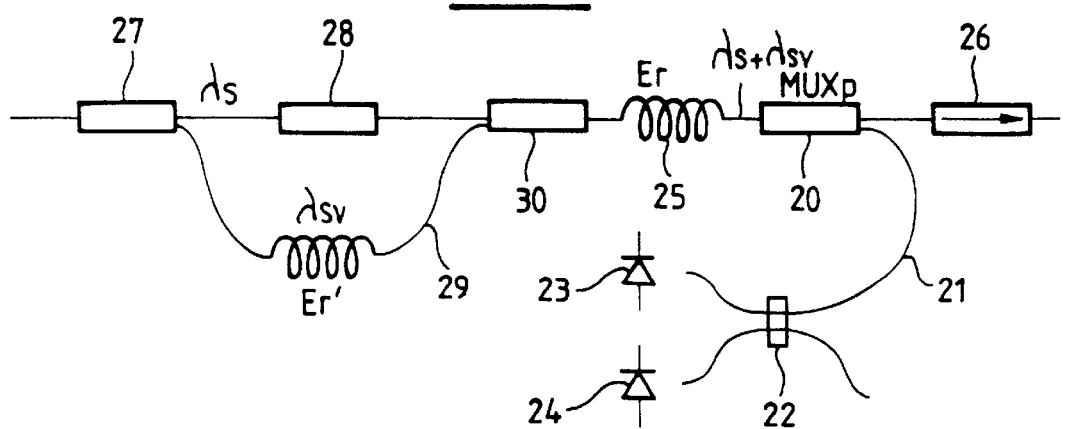
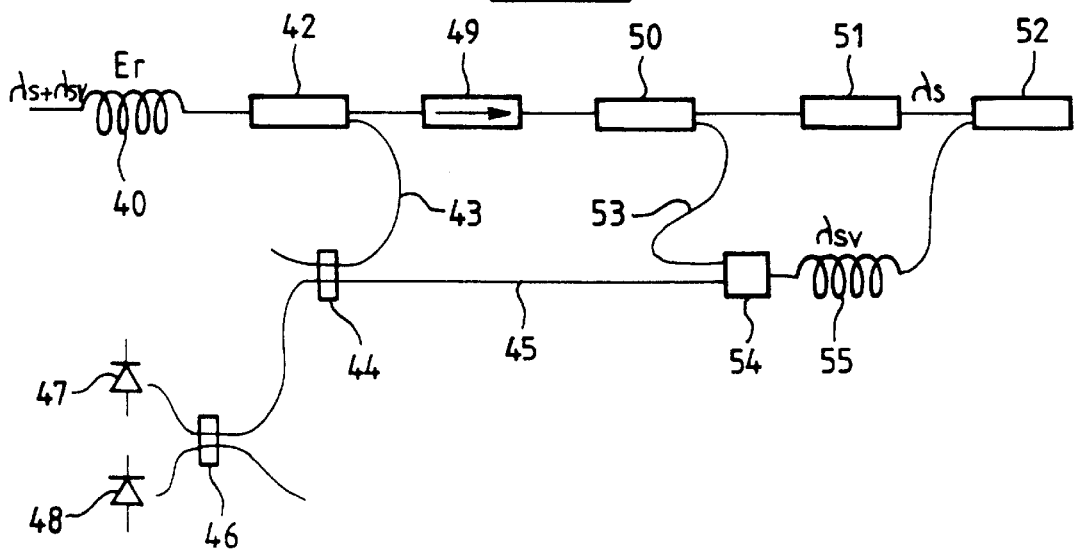

REPEATER FOR SOLITON SIGNAL FIBER OPTIC TRANSMISSION SYSTEMS

The present invention consists in a repeater for soliton signal fiber optic transmission systems and a method of transmitting information in a transmission system including a repeater of this kind.

It applies in particular to monitoring or surveillance of the repeaters of the transmission system or to location of faults in the transmission system.

Finally, it concerns a fiber optic transmission system including a repeater of the above kind.

The transmission of soliton pulses or solitons in the abnormal dispersion part of an optical fiber is known in itself. Solitons are pulse signals having a sech" shape. With this pulse shape, the non-linearity in the corresponding part of the fiber compensates the dispersion of the optical signal. The transmission of solitons is modeled in a manner known in itself using the non-linear Schrödinger equation.

Various effects limit the transmission of such pulses, such as the jitter induced by the interaction of the solitons with the noise present in the transmission system, as described for example in the article by J. P. Gordon and H. A. Haus, Optical Letters, vol. 11 No. 10, pages 665–667. This effect, known as the Gordon-Haus effect, imposes a theoretical limit on the quality or on the bit rate of transmission using solitons. Systems have been proposed using sliding guide filters to control the jitter of the transmitted solitons so that this limit can be exceeded—see for example EP-A-0 576 208. The use of intensity or phase modulators to regenerate the signal on the line has also been proposed.

Using control frequencies different from the frequencies used for the transmission of signals for repeater surveillance or monitoring in fiber optic transmission systems is known in itself. A fiber optic transmission system using such monitoring for optical repeaters is described in U.S. Pat. No. 4,899,043.

The conventional solution of U.S. Pat. No. 4,889,043 cannot be applied in a soliton signal fiber optic transmission system including sliding filters or synchronous modulators, for example. If a low-frequency signal were used as suggested in the above document it could not be transmitted through the system because of the presence of the sliding filters or the synchronous modulators.

U.S. Pat. No. 5,080,505 describes a soliton signal fiber optic transmission system in which optical amplifiers at regular intervals along the fiber have their gain controlled by a feedback signal from the next amplifier. To resolve indeterminacy regarding the gain, each amplifier uses low-frequency, for example sinusoidal, interference transmitted by the immediately upstream amplifier. GB-A-2 273 838 also describes a soliton signal fiber optic transmission system in which a low-frequency interference signal is used locally, i.e. in a repeater.

U.S. Pat. No. 5,080,505 and GB-A-2 273 838 propose the use of low-frequency interference in soliton signal fiber optic transmission systems to control modulators or amplifiers. In both the above documents the low-frequency signals are in the form of sinusoidaL interference with the transmitted signals and used only locally i.e. in the same repeater or from one repeater to another.

Using extending optical time domain reflectometery (EOTDR) for locating faults in a transmission system using optical amplifiers in the form of erbium-doped fibers is also known in itself, as described in the article by S. Furukawa et al, IEEE Photonics Technology Letters, vol. 7, No. 5. The above document specifies that the OTDR optical power must be kept as uniform as possible to prevent optical transients in the repeaters. This solution therefore cannot be used in soliton signal fiber optic transmission systems, the optical part of which includes at least one soliton signal monitoring device, such as a synchronous modulator or a filter.

The present invention proposes a novel and simple solution to the problem of optical repeater monitoring or surveillance in a soliton signal optical fiber transmission system. It also proposes a novel and simple solution to the problem of locating faults in a transmission system of the above kind. In the conventional way the repeaters can include filters, synchronous modulators or any other device known in itself or a combination of such devices. Using limited means, the invention enables the use of low-frequency signals for repeater monitoring or surveillance. It also enables the transmission of signals for locating faults, for example extended optical time domain reflectomertry type signals.

To be more precise, the invention proposes a repeater for soliton signal optical fiber transmission systems the optical part of which includes at least a soliton signal monitoring device, such as a filter or a synchronous modulator, and a branch connection for signals having a frequency or a format that would be cut off by the monitoring device.

The branch connection preferably includes a demultiplexer upstream of the monitoring device, a length of optical fiber and a multiplexer downstream of the monitoring device. It can also include a coupler upstream of the monitoring device, a length of optical fiber and a multiplexer downstream of the monitoring device.

The branch connection can include an amplifier for signals having a frequency that would be cut off by the monitoring device, for example an optical fiber doped with erbium.

An optical fiber doped with erbium can be provided for amplifying soliton signals and a common light source for pumping the optical fiber for amplifying the signals having a frequency or a format that would be cut off by the monitoring device and the optical fiber for amplifying the soliton signals.

The invention also proposes a method of transmitting information in a soliton signal optical fiber transmission system including at least one repeater of the above kind wherein not only soliton signals but also signals having a frequency or a format that would be cut off by the monitoring device are transmitted.

The signals having a frequency that would be cut off by the monitoring device can be low-frequency signals, for example signals transmitted under normal dispersion conditions in the optical fiber, or continuous wave signals modulated at a low frequency, or NRZ signals.

The signals having a format that would be cut off by the monitoring device can be extended optical time domain reflectometery type signals.

The invention also consists in the application of a method of the above kind to repeater monitoring or surveillance or to fault location.

Finally, the invention also proposes an optical transmission system including at least one repeater of the above kind.

Other features and advantages of the invention will be apparent from a reading of the following description of embodiments of the invention given by way of example and with reference to the accompanying drawings, in which:

FIG. 1 is a schematic representation of the optical part of the amplifier stage of a repeater of a conventional soliton signal transmission system;

FIG. 2 is a schematic representation of the optical part of the amplifier stage of a repeater of a soliton signal transmission system of the invention;

FIG. 3 is a schematic representation of the optical part of the amplifier stage of a repeater constituting a first embodiment of the invention;

FIG. 4 is a schematic representation of the optical part of the amplifier stage of a repeater constituting a second embodiment of the invention;

FIG. 5 is a schematic representation of the optical part of the amplifier stage of a repeater constituting a third embodiment of the invention.

FIG. 1 is schematic representation of the optical part of the amplifier stage of a repeater of a conventional soliton signal transmission system. A repeater of this kind typically includes at the input a length 1 of fiber providing an amplifier, for example a length of fiber doped with erbium. Downstream of the fiber 1 is a pump multiplexer MUXp 2 which feeds into the fiber optical pump signals that it receives on a fiber section 3. The latter is connected via a 30/70 to 50/50 coupler 4 to two diodes 5, 6 which supply the pump signals. Downstream of the multiplexer 2 are an optical isolator 7 and then a soliton signal monitoring device 8. The device 8 includes a filter or a synchronous modulator with appropriate clock recovery means, for example. These are the components usually employed for this purpose, but the device 8 can include other components.

As explained above, it is not possible in a soliton signal fiber optic transmission system including conventional repeaters of the FIG. 1 type and sliding filters or synchronous modulators to use low-frequency signals for repeater monitoring or surveillance: the low-frequency signals would be cut off by the sliding filters or by the synchronous modulators and could at best be used locally.

FIG. 2 is a schematic representation of the optical part of the amplifier stage of a repeater of a soliton signal transmission system of the invention. The repeater of FIG. 2 is identical to that of FIG. 1 but includes a branch connection for signals at a frequency that would be cut off by the monitoring device. In FIG. 2 this branch connection includes upstream of the soliton signal monitoring device 8 a demultiplexer 10 connected to one end of a length 11 of fiber and downstream of the device 8 a mulitplexer 12 connected to the other end of the fiber 11. Demultiplexer 10 transmits the signals at the frequencies corresponding to the soliton signals to the device 8 and transmits the low-frequency signals to the fiber 11. Multiplexer 12 multiplexes the signals at the frequencies corresponding to the soliton signals that it receives from the device 8 and the low-frequency signals that it receives from the fiber 11. In FIG. 2 and the subsequent figures the symbol λs is used for the frequencies of the soliton signals and the symbol λsv is used for the low-frequency signals.

The FIG. 2 repeater prevents the low-frequency signals from being cut off by the soliton signal monitoring device; it thus enables transmission of low-frequency signals through the transmission system, for example signals used for repeater monitoring or surveillance.

For example, for the purposes of repeater surveillance each repeater overmodulates its pump 5, 6 using a low-frequency signal at a given frequency constituting a signature; the corresponding low-frequency signal is transmitted to a terminal of the transmission system at which it is demodulated and processed in the conventional fashion. Thus repeater surveillance can be assured with minimal additional equipment in the repeaters.

For the purposes of repeater monitoring one of the terminals can transmit low-frequency signals that are recovered, filtered and analyzed in the repeaters. A signature frequency can be used for each repeater, as before, or a more complex control system. This kind of monitoring can be used to command a change of state at a repeater or to assure any other function.

It is also possible to use a low-frequency signal at a frequency chosen according to the components present in the repeaters and the terminals, by having all or some of the repeaters use the same frequency. In this case, the identity of a repeater can be carried by the frame of the low-frequency signal and not by the frequency of the signal. The two methods can be combined.

In either case the signals used can have a low depth of modulation, so causing relatively little interference in the transmission system.

The invention enables the transmission of low-frequency signals through the system. A continuous wave overmodulated at a low-frequency can be used, for example, or NRZ pulse signals at a low bit rate. The possible bit rates or frequencies can be up to a few hundred MHz. Wavelength ranges from 1 530 mm to 1 555 mm are advantageous. This range corresponds to normal dispersion conditions suited to the NRZ or RZ format in the required range of bit rates and is sufficiently far removed from the wavelengths of the soliton signals not to interact with the latter. Moreover, being sufficiently far removed in the spectrum, these signals offer evident facility of demultiplexing-remultiplexing.

The low-frequency signals are transmitted under normal dispersion conditions, which limits interference on the soliton channels.

The invention also proposes to match the gain of the repeater to the low-frequencies used. FIGS. 3 through 5 show various embodiments of the invention for matching the gain of the repeater when a doped fiber is used to amplify the signal.

In the first embodiment shown in FIG. 3 the repeater includes a pump mulitplexer 20 which feeds into the fiber the optical pump signals that it receives on a fiber section 21. The latter is connected via a 30/70 to 50/50 coupler 22 to two diodes 23, 24 which supply the pump signals. The multiplexed signals are transmitted to a length 25 of erbium-doped fiber and then to an isolator 26. The soliton signal monitoring device 28 and the bypass 29 for the low-frequency signals are as shown in FIG. 2; the isolator 26 is connected to a demultiplexer 27 which separates the soliton signals from the low-frequency signals and transmits them respectively to the device 28 and to a length 29 of fiber forming the branch connection or bypass. The signals transmitted by the device 28 and the fiber 29 are combined by the multiplexer 30 and transmitted to the output of the repeater. The use for the bypass 29 of an appropriate length of doped fiber with a different index than the fiber 25 enables the gain of the repeater to be matched to the low frequencies transmitted. As is clearly apparent in the figure, the configuration of the first embodiment of the invention enables the use of a single pump source.

The second embodiment shown in FIG. 4 is similar to that of FIG. 3. The repeater includes the demultiplexer 27, the soliton signal monitoring device 28, the bypass 29 for the low-frequency signals, the multiplexer 30, the length 25 of erbium-doped fiber, the pump multiplexer 20 and finally the isolator 26. The pump source is similar to that of FIG. 3. Again, the FIG. 4 embodiment enables the use of a single pump source.

FIG. 5 is a diagrammatic representation of the optical part of the amplifier stage of a repeater constituting a third embodiment of the invention; the FIG. 5 repeater includes at the input a length 40 of fiber providing an amplifier, for example a fiber doped with erbium. Downstream of the fiber 40 is a first pump multiplexer MUXp 42 which feeds into the fiber the optical pump signals that it receives on a fiber section 43. The latter is connected via an approximately 10/90 coupler 44 to a fiber section 45; one end of the section 45 is connected via a 30/70 to 50/50 coupler 46 to two diodes 47, 48 which supply the pump signals. The fiber 40 amplifiers the soliton signals and the low-frequency signals.

Downstream of the first multiplexer 42 are an isolator 49 and then a demultiplexer 50 which separates the soliton signals from the low-frequency signals. The soliton signals are transmitted to the soliton signal monitoring device 51 and then to a multiplexer 52. The low-frequency signals from the demultiplexer 50 are transmitted via a length 53 of fiber to a second pump multiplexer 54 which also receives the pump signals at the other end of the fiber 45. The output of the second pump multiplexer 54 is connected to a length 55 of doped fiber for amplifying the low-frequency signals. The amplified low-frequency signals are multiplexed by the multiplexer 52 with the soliton signals from the control device 51. This combination constitutes the output of the repeater.

As in the embodiments of FIGS. 3 and 4, the FIG. 5 embodiment enables the gain of the repeater to be matched to the wavelength used for the low-frequency signals. In the FIG. 5 device a 10/90 coupler could be used instead of the demultiplexer 50, the gain in the fiber 53 being modified if necessary. Similarly, a coupler could be used instead of the multiplexer upstream of the monitoring device in the embodiments of FIGS. 3 and 4.

Thus the invention enables the transmission through a soliton signal fiber optic transmission system of signals with a format that would be cut off by the monitoring devices of the repeaters, such as filters, synchronous modulators or any other device known in itself or a combination of such devices. In other words, the repeaters conventionally used in soliton signal fiber optic transmission systems feature monitoring devices designed for the non-linear transmission of soliton signals and which will not necessarily pass signals having a different format, for example non-soliton RZ or NRZ signals with limited means the invention enables the use of signals with a format that would be cut off in this way, for example extended optical time domain reflectometery type signals which can be used to locate faults, as mentioned above.

The invention enables the use in soliton signal fiber optic transmission systems of signals having frequencies that would be cut off by the soliton signal monitoring devices and/or signals having formats that would be cut off by the soliton signal monitoring devices. These various signals can be combined or a single type of signal can be used, as required.

Of course the present invention is not limited to the examples and embodiments described and shown but is open to many variants that will be evident to the skilled person. For example, devices other than doped fibers, as used in FIGS. 3 to 5, could be used to amplify the signals. In this case, the FIG. 2 embodiment could suffice for implementation of the invention. Pump optical sources other than the double sources of FIGS. 2 through 5 could be used, for example single sources or independent pump sources for amplifying the soliton signals and for amplifying the other signals.

The invention is particularly advantageous for soliton signal transmission systems. It could also be adapted for use with other types of signals where the monitoring devices cut off low frequencies or block given signal formats.

What is claimed is:

1. A repeater for a soliton signal optical fiber transmission system, said system for transmitting soliton signals, said repeater comprising:

an optical soliton signal monitoring device (8, 28, 51) adapted to handle soliton signals; and an optical bypass (11, 29, 55) for other signals to allow said other signals to bypass the monitoring device.

2. A repeater according to claim 1, wherein said optical bypass includes a demultiplexer (10, 27) upstream of the monitoring device, a length (11, 29) of optical fiber, and a multiplexer (12, 30) downstream of the monitoring device.

3. A repeater according to claim 1, wherein said optical bypass includes an optical coupler upstream of the monitoring device, a length of optical fiber, and a multiplexer downstream of the monitoring device.

4. A repeater according to claim 1, wherein the optical bypass includes an optical amplifier.

5. A repeater according to claim 4, wherein the optical amplifier comprises a first Er-doped optical fiber (29, 55).

6. A repeater according to claim 5, further comprising:

a second Er-doped optical fiber (25, 40) for amplifying the soliton signals; and a common light source for pumping the first Er-doped optical fiber (29, 55) for amplifying the other signals and for pumping the second Er-doped optical fiber (25, 40) for amplifying the soliton signals.

7. A method in a soliton signal optical fiber transmission system including at least one repeater comprising at least an optical soliton signal monitoring device operative to monitor soliton signals, said method comprising transmitting information using both said soliton signals and signals other than said soliton signals, said other signals having a frequency or format that would be cut off by the monitoring device.

8. A method according to claim 7, wherein said other signals have a frequency lower than a frequency of said soliton signals.

9. A method according to claim 7, wherein said other signals are transmitted under normal dispersion conditions in the optical fiber.

10. A method according to claim 8, wherein said other signals are transmitted under normal dispersion conditions in the optical fiber.

11. A method according to claim 7, wherein said other signals are continuous wave signals modulated at a low frequency.

12. A method according to claim 7, wherein said other signals are NRZ signals.

13. A method according to claim 7, wherein said other signals are extended optical time domain reflectometery type signals.

* * * * *